United States Patent [19]
Yokoyama et al.

[11] Patent Number: 5,847,833
[45] Date of Patent: Dec. 8, 1998

[54] DISTANCE MEASURING METHOD AND DISTANCE MEASURING APPARATUS

[75] Inventors: Atsushi Yokoyama, Kanagawa; Takayuki Yoshigahara, Tokyo, both of Japan

[73] Assignee: Sony Corporation, Japan

[21] Appl. No.: 634,768

[22] Filed: Apr. 19, 1996

[30] Foreign Application Priority Data

Apr. 26, 1995 [JP] Japan .................................... 7-101517

[51] Int. Cl.[6] .................................................. G01B 11/24
[52] U.S. Cl. ........................ 356/375; 356/376; 250/559.29
[58] Field of Search .................................. 356/375, 376; 250/559.24, 559.29

[56] References Cited

FOREIGN PATENT DOCUMENTS 6137824  5/1994  Japan .

Primary Examiner—Frank G. Font
Assistant Examiner—Amanda Merlino
Attorney, Agent, or Firm—Ronald P. Kananen

[57] ABSTRACT

Two photodiodes are disposed side by side in the direction in which the slit light reflected from the object to be measured moves. One photodiode 1 of the two photodiodes receives the reflected slit light for a longer period than the other photodiode 2. When neither of the two photodiodes receive the slit light reflected from the object to be measured but both receive the same bias light, even if very weak noise light is incident from the outside or the characteristics of the photodiodes slightly differ, a higher light current flows through the photodiode 1 than through the photodiode 2, making the output of the clock-type comparator 7 stable in the initial state. This allows distance measurement to be always performed stably.

14 Claims, 9 Drawing Sheets

DISTANCE MEASURING METHOD AND DISTANCE MEASURING APPARATUS

BACKGROUND OF THE INVENTION

1. Field of the Invention

The present invention relates to distance measuring methods and distance measuring apparatuses, and more particularly, to a distance measuring method and a distance measuring apparatus which enable the shape of a three-dimensional object to be correctly measured.

2. Description of the Related Art

In distance measurement based on the optical cutting method using slit light, as shown in FIG. 6, the three-dimensional position of the object to be measured is obtained according to triangulation with the use of the projection direction of slit light from a light source, the view direction of a camera including a lens and an imaging plane, and the positional relationship between the light source and the camera (will be described in detail later).

Research on performing the above-described distance measurement at a high speed by scanning with slit light using a scanning mirror has recently been actively pursued, and some methods have been proposed. The inventors have proposed a distance measuring method in U.S. Pat. No. 5,408,324. In such method, a surface of an object to be measured is scanned with slit light and the time at which when the slit light reflected from the object passes through a plurality of two-dimensionally disposed cells which constitute the imaging surface of a sensor is detected to measure the position of the surface of the object. Two photosensors are disposed side by side in each cell in the direction in which reflected slit light moves, the magnitudes of the light currents output from the two photosensors are compared, and the time at which reflected slit light moves from one of the two photosensors to the other is obtained according to the comparison result. The time obtained is regarded as the time at which the reflected slit light passes through the cell.

The principle of the above-described proposed high-speed distance measuring method proposed will be described below. In such method, cells are two-dimensionally disposed in a sensor, the direction in which slit light strikes on the point where the view from each cell intersects the object to be measured is measured, and the three-dimensional information corresponding to each cell is measured in parallel using triangulation.

As shown in FIG. 6, slit light emitted from a laser source 50 illuminates a scanning mirror 52 through a cylindrical lens 51 and an object to be measured 53 is scanned with the slit light by rotating the scanning mirror 52 in order to perform distance measurement in parallel for each cell. The slit light reflected from the object 53 forms an image on an imaging plane 55A of a sensor 55 through a lens 54. The time at which the slit light which forms an image on the sensor 55 passes through each cell $P_{i,j}$ disposed in a matrix in the sensor 55 is measured and the angle of the scanning mirror 52 is obtained for each cell $P_{i,j}$.

From the time at which light passes through cell $P_{i,j}$ in the sensor 55, the angle, $\alpha_{i,j}$, of the scanning mirror 52 for the cell on which the light forms an image is obtained. Then, distance $Z_{i,j}$, which is measured by the cell $P_{i,j}$, is obtained from expression (1) as shown in FIG. 7, which illustrates the geometrical relationship for the principle of high-speed distance measurement.

$$Z_{i,j} = \frac{\tan\alpha_{i,j} \cdot \tan\beta_{i,j}}{\tan\alpha_{i,j} + \tan\beta_{i,j}} \left( B_{i,j} + \frac{A}{\tan\alpha_{i,j}} \right) \tag{1}$$

As shown in FIG. 7, $\beta_{i,j}$, $B_{i,j}$, and A are known constants. $\beta_{i,j}$ represents the angle formed by the surface of the sensor 55 and the fixed view direction of cell $P_{i,j}$, $B_{i,j}$ indicates the horizontal distance in the figure from the scanning mirror 52 to cell $P_{i,j}$, and A represents the vertical distance in the figure from the scanning mirror 52 to the sensor 55.

During one scanning with slit light, the measurement is performed in parallel for all cells $P_{i,j}$, in the sensor 55 and the distance $Z_{i,j}$ from each cell $P_{i,j}$ to the point where the fixed view direction of each cell intersects the object 53 is measured.

Since it is important to robustly measure the time at which slit light for scanning moves across each cell $P_{i,j}$, a high-precision measuring method for the time at which light passes each cell $P_{i,j}$ will be described below by referring to FIG. 8. As shown in FIG. 8, two photosensors 61 and 62 are disposed side by side in the scanning direction with light in one cell $P_{i,j}$. The light currents generated in the two photosensors 61 and 62 when the cell $P_{i,j}$ is scanned with light are amplified by amplifiers 63 and 64, and the output levels of the amplifiers 63 and 64 are compared by a comparator 65 to measure the time at which the light moves across the cell $P_{i,j}$.

As shown in FIG. 8, assuming that the photosensor 61 and the photosensor 62 are disposed at the right-hand side and the left-hand side respectively, and reflected slit light moves from right to left in the figure, the output level of the right-hand photosensor 61 gradually increases then decreases, first as shown in FIG. 9. Next, the output of the left-hand photosensor 62 gradually increases and then decreases. When the output levels of the photosensors 61 and 62 are compared by the comparator 65, it is found that the magnitudes of the light currents output from the right- and left-hand photosensors 61 and 62 reverse at time T (the output level of the photosensor 61 is larger than that of the photosensor 62 until time T whereas the output level of the photosensor 62 is larger than that of the photosensor 61 after time T). Therefore, the output of the comparator reverses from low to high at time T. Time T is regarded as the time at which reflected slit light moves across the cell $P_{i,j}$.

Since the output of the photosensor 61 is connected to the inverted-input terminal of the comparator 65 and the output of the photosensor 62 is connected to the non-inverted-input terminal, output Y of the comparator 65 is low when a higher light current flows through the photosensor 61, and it is high when a higher light current flows through the photosensor 62. The instant time, T, when the output changes from low to high is recorded as the time at which slit light passes.

Even when bias light (light other than slit light, incident on the sensor 55 as a disturbance from the surroundings) from the surroundings changes, the temperature changes, or a difference occurs in characteristics of the object, such as surface reflection characteristics, since the two photosensors 61 and 62 are disposed side by side, the two light currents increase and decrease in the same way. Therefore, the time at which the magnitudes of the two light currents reverse rarely changes due to these effects. As a result, high-precision, reliable distance measurement is possible.

The inventors have also proposed a distance measuring apparatus for stabilizing the above-described distance measurement in the Japanese Patent Application laid open No. 137824/94. In this apparatus, since one of the two photosensors 61 and 62 has a larger area than the other, the comparator 65 always outputs a low signal when slit light is not emitted to the object observed by the two photosensors 61 and 62.

As shown in FIG. 10 (the amplifiers 63 and 64 are not shown in FIG. 10), when the two photosensors 61 and 62 have the same area, if an image of the object to be measured is formed by slit light on the photosensor 61 or the photosensor 62, the corresponding light currents are generated as shown in FIG. 11. When the photosensors 61 and 62 receive bias light only, however, output Y of the comparator 65 is not stable due to noise or a difference in the characteristics of the photosensors 61 and 62. This means that output Y of the comparator 65 changes from low to high at some points (indicated by arrows in FIG. 12) other than time T, as shown in FIG. 12.

When the area of the photosensor 61 is made slightly larger than that of the photosensor 62 as shown in FIG. 13, a higher light current flows through the photosensor 61 than through the photosensor 62 by Δj (corresponding to an area difference) as shown in FIG. 14. As a result, the comparator 65 always outputs a low signal as shown in FIG. 15 while the photosensors 61 and 62 receive bias light, making output Y stable. Output Y changes from low to high only at time T, and it becomes easy to detect the passage of slit light.

The detailed configuration of each cell $P_{i,j}$ in the above-described distance measuring apparatus will be described below. As shown in FIG. 16, each cell $P_{i,j}$ comprises two photodiodes 71 and 72 serving as photosensors, current mirror circuits 73 and 74, amplifier sections 75 and 76, a clock-type comparator 77, and a read section 78.

Which of a pair of photodiodes, namely, which of the two photodiodes 71 and 72 disposed side by side, receives a larger magnitude of light is determined by comparing the corresponding light currents. In this case, it is assumed that reflected slit light moves from left to right in FIG. 16, namely, in the direction from the photodiode 71 to the photodiode 72. As described above, to stabilize the initial magnitude relationship between the two light currents, the area of the photodiode 71 is set larger than that of the photodiode 72. With this configuration, the light current in the photodiode 71 becomes higher than that in the photodiode 72 in a usual environment and a dark space, stabilizing the initial state.

The current mirror circuits 73 and 74 amplify light currents and serve as buffers between the photodiodes 71 and 72 and the amplifier sections 75 and 76. The current mirror circuits 73 and 74 amplify by a factor of two the light currents in the photodiodes 71 and 72, shield noise from the amplifier sections 75 and 76, and reduce the influences from the junction capacitors in the photodiodes 71 and 72.

The amplifier sections 75 and 76 comprise CMOS inverters 81a and 81b, and CMOS switches 82a and 82b for short-circuiting the inputs and outputs of the CMOS inverters, respectively. The amplifier sections 75 and 76 invert the outputs of the photodiodes 71 and 72, and amplify them.

The clock-type comparator 77 compares the inverted output voltages of a pair of photodiodes, namely the photodiodes 71 and 72, which have been amplified by the amplifier sections 75 and 76. The clock-type comparator 77 comprises CMOS inverters 83 and 84 connected in a positive feedback loop. This clock-type comparator 77 is initialized such that its voltage is set to an intermediate voltage by a CMOS switch 85. The outputs of the amplifier sections 75 and 76 are connected to the CMOS inverters 83 and 84 through CMOS switches 86 and 87, respectively.

The read section 78 is selected by selection signal $X_n$, and inverts and outputs to the outside the state of the clock-type comparator 77 as $Y_n$.

The CMOS switch 85, the CMOS switches 86 and 87, and the CMOS switch 82a and 82b are respectively controlled by sampling pulses φ1, φ2, and φ3 all having four time periods "a" to "d" as shown in FIG. 17, and the output of the clock-type comparator 77 is read from the outside.

In time period "a," the CMOS switches 82a and 82b are turned on by sampling pulse φ3 as shown in FIG. 17 to short-circuit the inputs and outputs of the amplifier sections 75 and 76, and their voltages are reset to the intermediate voltages of the inputs and outputs. During this period, the CMOS switches 85, 86, and 87 are opened (off) by sampling pulses φ2 and φ3.

In period "b," the CMOS switches 82a and 82b are also set to open by sampling pulse φ3. The light currents corresponding to the strength of incident light from the photodiodes 71 and 72 are amplified by the current mirror circuits 73 and 74, and the capacitors of the amplifier sections 75 and 76 are charged with the charges corresponding to the light currents.

In period "c," the CMOS switch 85 is turned on by sampling pulse φ1 to short-circuit both ends (points SA and SB in FIG. 16) of the clock-type comparator 77, and the voltage is set to the intermediate voltage.

In period "d," the CMOS switch 85 is set to open by sampling pulse φ1 to release the balanced condition of the clock-type comparator 77, which is balanced to the intermediate voltage so far. At the same time, the CMOS switches 86 and 87 are short-circuited by sampling pulse φ2, and the outputs of the two amplifier sections 75 and 76 (the outputs of the photodiodes 71 and 72) are input to points SA and SB of the clock-type comparator 77, respectively. When the output level of the photodiode 71 is larger than that of the photodiode 72, the voltage at point SB is high. When the output level of the photodiode 71 is smaller than that of the photodiode 72, the voltage at point SB is low.

When selection signal $X_n$ is given, the voltage at point SB in the clock-type comparator 77 is inverted and output to the outside as digital value $Y_n$. At the outside, the time, T, when digital value $Y_n$ changes from low to high is detected and it is maintained as the time at which light moves across cell $P_{i,j}$.

Since the weights of the light currents from the photodiodes 71 and 72 are implemented by a difference in the areas of the photodiodes in the distance measuring apparatus using the configuration shown in FIG. 13 (FIG. 16), the following problems which cannot be solved take place.

Due to differences in characteristics of the two photodiodes 71 and 72 and a difference in the magnitudes of bias light caused by a difference in the spatial positions, even when slit light does not strike on the photodiodes, output Y may be high. Output Y is not always stable. There is a large influence of noise against output Y.

If weak slit light is used, the light currents in the two photodiodes 71 and 72 have no difference, and a high output Y cannot be achieved. In other words, the sensitivity is low.

As described above, the weights of the light currents, which are implemented by a difference in the areas, cannot be changed. Therefore, when brightness in the surroundings changes, the reflection coefficient of the object to be measured changes, the magnitude of noise varies, or the measuring sensitivity becomes low, necessary adjustment cannot be performed.

SUMMARY OF THE INVENTION

Accordingly, it is an object of the present invention to provide a distance measuring method and a distance measuring apparatus which allow stable distance measurement to be always performed even when noise exists and the characteristics of the photosensors differ.

The above object of the present invention is achieved through the provision of a distance measuring method and a distance measuring apparatus in which one of two photosensors disposed side by side in the direction in which the slit light reflected from the object to be measured moves receives the reflected slit light for a longer period than the other photosensor.

According to the present invention, since one of two photosensors disposed side by side in the direction in which the slit light reflected from the object to be measured moves receives the reflected slit light for a longer period than the other photosensor, when neither of the two photosensors receive the slit light reflected from the object to be measured but both receive the same bias light, even if very weak noise light is incident from the outside or the characteristics of the photosensors slightly differ, a higher light current flows through the photosensor which receives the reflected slit light for a longer period than through the other photosensor. This means the output of the comparison is stable and the time at which the slit light reflected from the object passes is correctly detected.

DETAILED DESCRIPTION OF THE PREFERRED EMBODIMENTS

Figure 1:
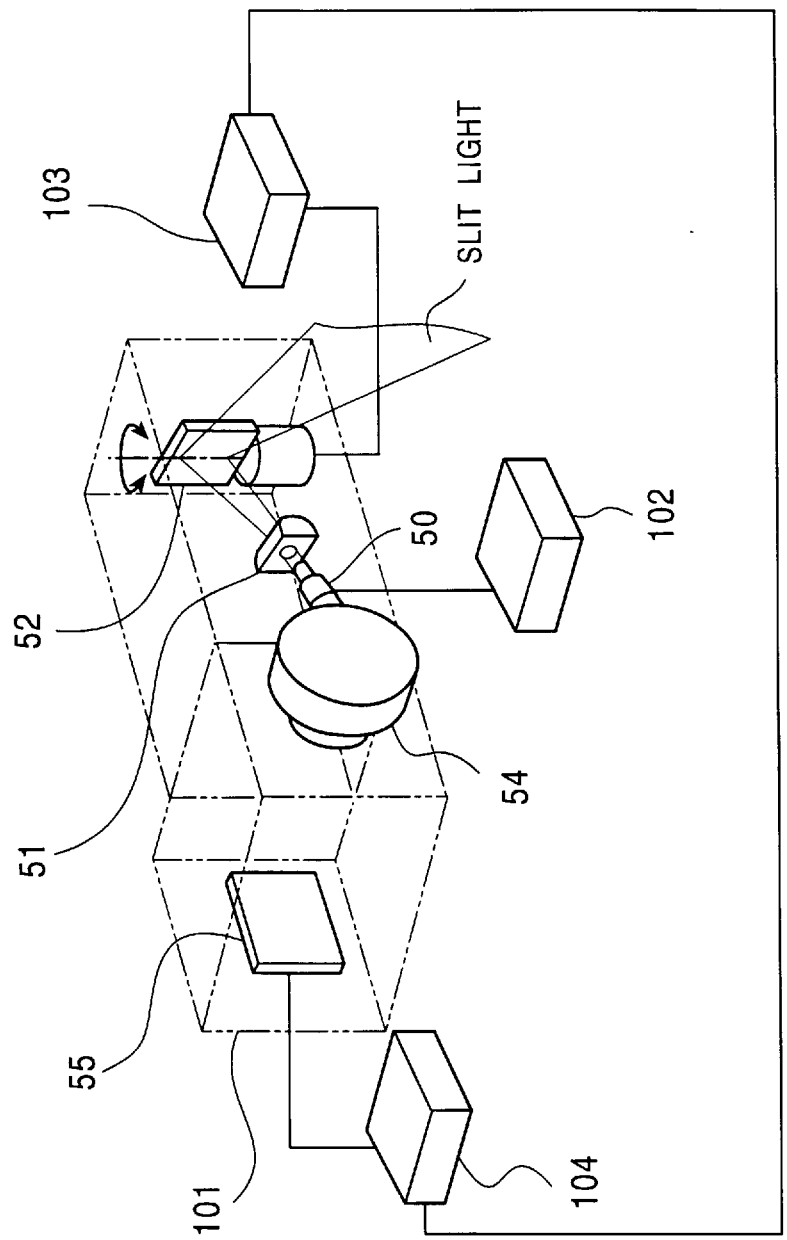
FIG. 1 is a view showing an example configuration of a distance measuring apparatus according to the present invention.

Embodiments of the present invention will be described below by referring to the drawings.

Figure 6:
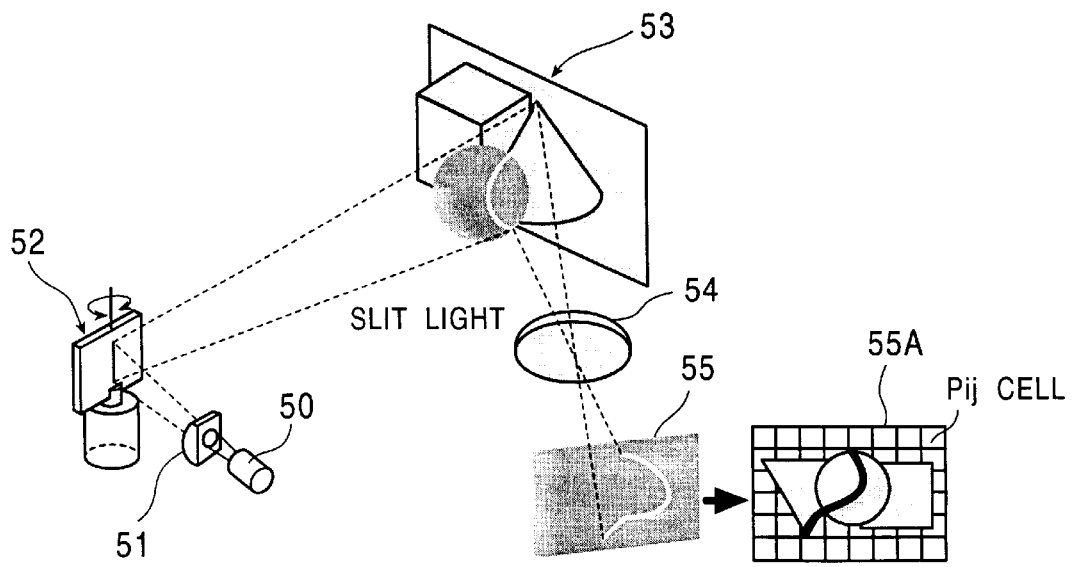
FIG. 6 is a view showing a configuration of a conventional distance measuring apparatus.
Figure 7:
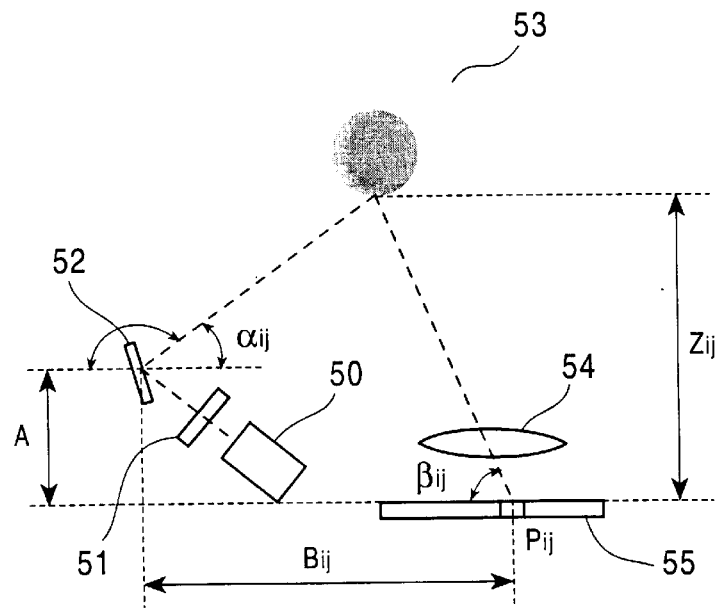
FIG. 7 is a view illustrating the principle of distance measurement in the distance measuring apparatus shown in FIG. 6.
Figure 8:
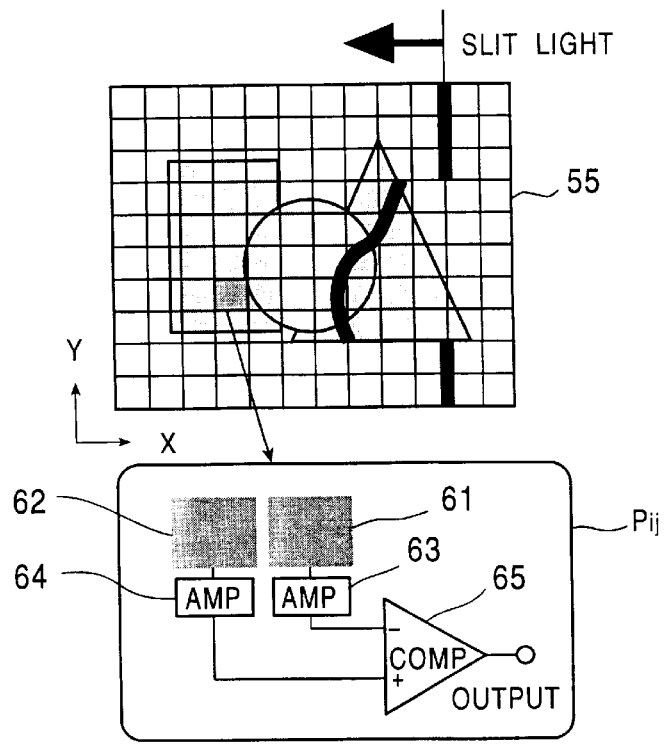
FIG. 8 is a view showing a sensor and a cell in the distance measuring apparatus shown in FIG. 6.

FIG. 1 shows a whole configuration of a distance measuring apparatus according to the present invention. The portions corresponding to those shown in FIG. 6 are indicated by the same symbols as in FIG. 6, and the descriptions thereof are omitted.

Figure 2:
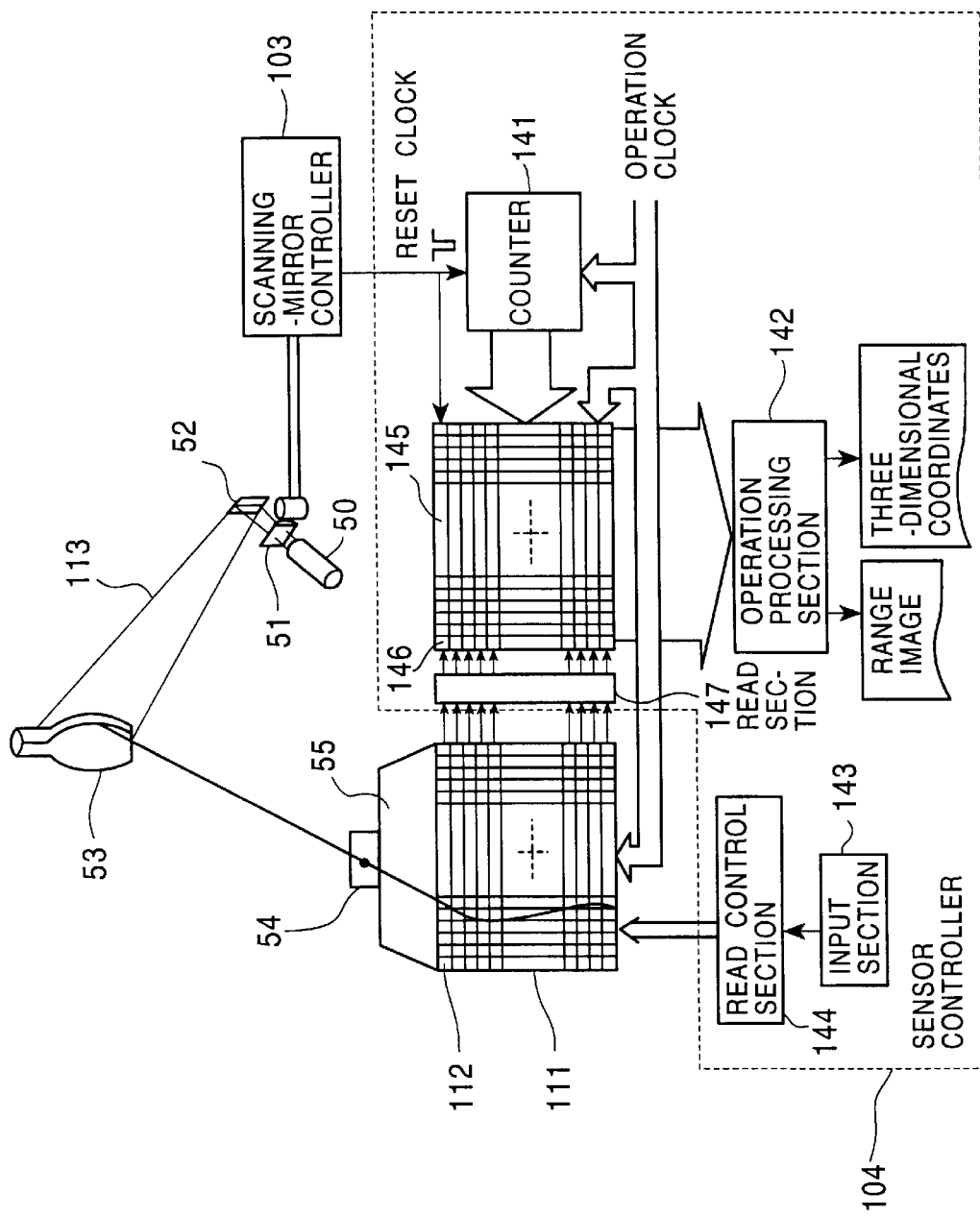
FIG. 2 is a view showing a detailed configuration of the sensor 55 and the sensor controller 104 shown in FIG. 1.

In this embodiment, a camera module 101 comprises a laser source 50, a cylindrical lens 51 for converting the laser emitted from the laser source 50 to slit light, and a scanning mirror 52 for reflecting the slit light emitted from the cylindrical lens 51, toward an object to be measured 53 (shown in FIG. 2). The laser source 50 is a semiconductor laser having a wavelength of, for example, 670 nm. Slit light having a power of 10 mW at the output of the lens and a width of about 1 mm is generated. The camera module 101 further comprises a lens 54 for converging light reflected from the object to be measured 53 and a sensor 55 on which the light converged by the lens 54 forms an image.

A laser controller 102 controls the laser source 50. It controls emission of a laser, stops emission, controls the power of a laser, and so on. A scanning mirror controller 103 rotates the scanning mirror 52 at the specified speed so that the object to be measured 53 is scanned with slit light. A sensor controller 104 controls the sensor 55 in response to a timing signal (reset clock) supplied from the scanning mirror controller 103.

FIG. 2 shows a more detailed configuration of the sensor 55 and the sensor controller 104. As shown in FIG. 2, the sensor 55 has an imaging plane 111 formed by a plurality of cells 112 disposed in a matrix in the horizontal and vertical directions. The imaging plane 111 receives the slit light 113 reflected from the object to be measured 53 (reflected slit light).

Charges accumulated in the cells 112 of the sensor 55 are supplied to a read section 147 under the control of a read control section 144 in the sensor controller 104. The read section 147 detects the timing when each cell 112 receives light and outputs the detection signal to count memory 145. The count memory 145 comprises memory cells 146 corresponding to the cells 112 in the sensor 55. Each memory cell 146 stores the count of a counter 141. The count is reset when the scanning mirror controller 103 sends a reset clock.

The counter 141 in the sensor controller 104 counts an operation clock (for example, having a frequency of about 100 kHz) supplied from a timing control circuit (not shown) and supplies the count to the count memory 145. The operation clock is also supplied to the sensor 55 and the count memory 145.

The scanning mirror controller 103 generates a reset clock (for example, having a frequency of 60 Hz) at every scanning (every time the scanning mirror 52 makes one turn) to reset the count in the counter 141 and the value stored in the count memory 145.

An operation processing section 142 receives data read from the count memory 145, and applies the specified operation to obtain the three-dimensional coordinates and the range image of the object to be measured 53.

An input section 143 is operated by the user to make the specified input to a read control section 144.

The operation of each portion will be described below. Slit light emitted from the laser source 50 is extended in the vertical direction in the figure by the cylindrical lens 51 and incident on the scanning mirror 52. Since the scanning mirror 52 is rotated by the scanning mirror controller 103 at the specified angular velocity (60 Hz), the slit light 113 reflected from the scanning mirror 52 moves across the object to be measure 53 at every 1/60 seconds.

Slit light reflected from the object to be measured 53 forms an image on the imaging surface 111 in the sensor 55.

As described above, the cells 112 are disposed on the imaging plane 111 in a matrix. Let an cell disposed at row i and column j be called cell $P_{i,j}$. When reflected slit light is incident on cell $P_{i,j}$, the cell outputs the signal corresponding to the received light. The read section 147 detects the timing when the output level of $P_{i,j}$ is inverted and regards it as the timing when reflected slit light is incident on the cell.

The counter 141 starts counting the operation clock from the timing when the reset clock is input, and supplies the count to the count memory 145. Since the count memory 145 has a memory cell 146 corresponding to a cell 112 of the sensor 55 as described above, let a memory cell corresponding to cell $P_{i,j}$ be called cell $M_{i,j}$. When the read section 147 outputs a signal indicating the detection of the level inversion of the signal output from cell $P_{i,j}$, cell $M_{i,j}$ corresponding to cell $P_{i,j}$ which outputs the signal stores the count of the counter 141.

Since the scanning mirror 52 rotates at a constant angular velocity, the count in the counter 141 corresponds to the rotation angle of the scanning mirror 52. The operation processing section 142 performs the operation corresponding to expression (1) with the count stored in cell $M_{i,j}$ to obtain distance $Z_{i,j}$ corresponding to cell $P_{i,j}$. The operation processing section 142 outputs the three-dimensional coordinates of the object 53 observed by cell $P_{i,j}$, and also outputs the range image corresponding to the video information of an image of the object 53 formed on the imaging plane 111 of the sensor 55.

Since the scanning mirror controller 103 outputs a reset clock every time the scanning mirror 52 rotates one turn, the count in the counter 141 and the value stored in the count memory 145 are reset in response to the reset clock.

Measurement is performed in parallel for all cells in the sensor 55 during one scanning with slit light, and distance $Z_{i,j}$ from cell $P_{i,j}$ to the point where the fixed view from cell $P_{i,j}$ intersects the object to be measured 53. The method for calculating the distance is the same as that used in the conventional case and the description thereof is omitted here.

Figure 3:
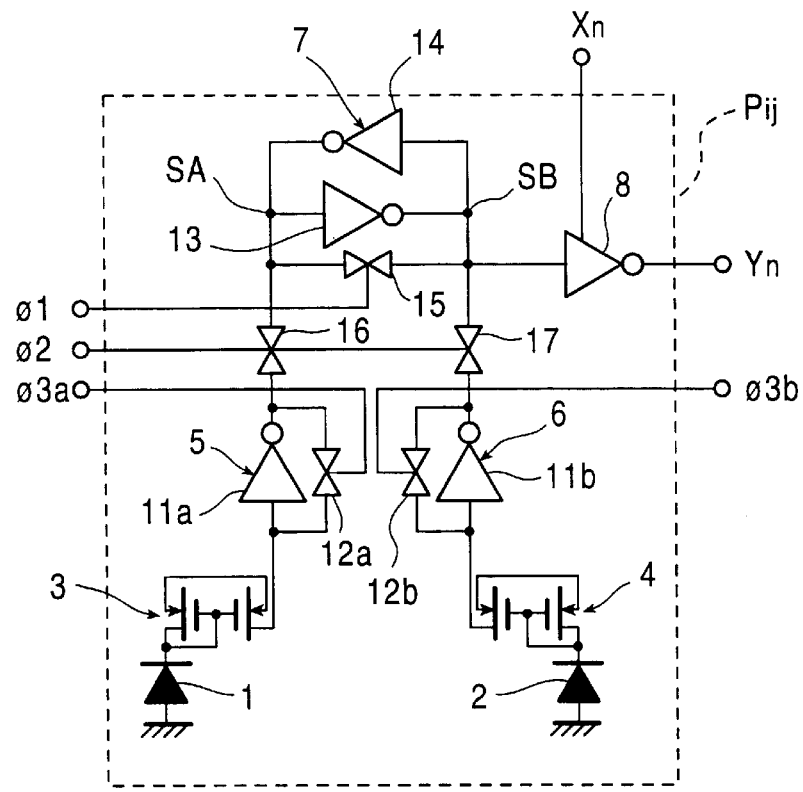
FIG. 3 is a circuit diagram showing a configuration of a cell in a distance measuring apparatus according to an embodiment of the present invention.

Cell $P_{i,j}$ in the sensor 55, which is the main portion of this embodiment, will be described next. Cell $P_{i,j}$ comprises photodiodes 1 and 2 having the same-size light-receiving areas and serving as photosensors, current mirror circuits 3 and 4, charge collectors, e.g., amplifier sections 5 and 6, a clock-type comparator 7, and a read section 8, as shown in FIG. 3.

Which of a pair of photodiodes, namely, which of the two photodiodes 1 and 2 disposed side by side in the scanning direction, receives a larger magnitude of light is determined by comparing the corresponding light currents. In this case, it is assumed that reflected slit light moves from left to right in FIG. 3, namely, in the direction from the photodiode 1 to the photodiode 2.

The current mirror circuits 3 and 4 amplify the light currents from the two photodiodes 1 and 2, and serve as buffers between the photodiodes 1 and 2 and the amplifier sections 5 and 6. The current mirror circuits 3 and 4 amplify by a factor of two the light currents in the photodiodes 1 and 2, shield noise from the amplifier sections 5 and 6, and reduce the influences from the junction capacitors in the photodiodes 1 and 2.

The amplifier sections 5 and 6 comprise CMOS inverters 11a and 11b, and CMOS switches 12a and 12b for short-circuiting the inputs and outputs of the CMOS inserters, respectively. The amplifier sections 5 and 6 invert the output voltages of the photodiodes 1 and 2, and amplify them.

The clock-type comparator 7 compares the output voltages of a pair of photodiodes, namely the photodiodes 1 and 2, which have been amplified by the amplifier sections 5 and 6. The clock-type comparator 7 comprises CMOS inverters 13 and 14 connected in a positive feedback loop. This clock-type comparator 7 is initialized such that its voltage is set to an intermediate voltage by a CMOS switch 15. The outputs of the amplifier sections 5 and 6 are connected to the CMOS inserters 13 and 14 through CMOS switches 16 and 17, respectively.

Figure 4:
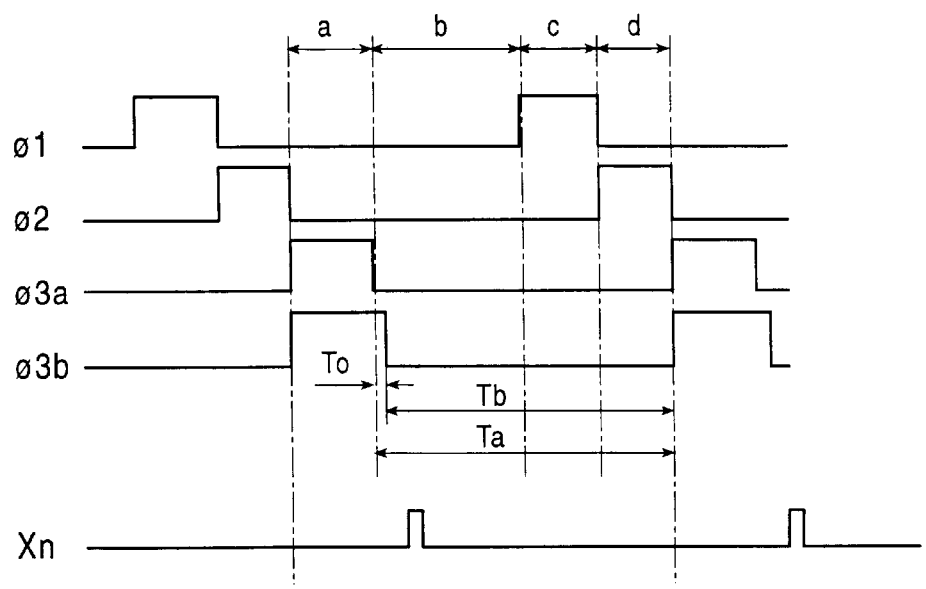
FIG. 4 is a timing chart describing the operation of the cell shown in FIG. 3.

The read control section 144, shown in FIG. 2, generates sampling pulses $\phi 1$, $\phi 2$, $\phi 3a$, and $\phi 3b$ to operate cell $P_{i,j}$ in the cycles of four time periods "a" to "d" shown in FIG. 4. The CMOS switch 15 is turned on and off by sampling pulse $\phi 1$, the CMOS switch 16 is turned on and off by sampling pulse $\phi 2$, the CMOS switch 12a by sampling pulse $\phi 3a$, and the CMOS switch 12b by sampling pulse $\phi 3b$.

The read control section 144 also supplies selection signal $X_n$ to the read section 8 of cell $P_{i,j}$ to read the inverted state of point SB in the clock-type comparator 7 as $Y_n$.

The operation of the embodiment shown in FIG. 3 will be described below. In time period "a," the CMOS switches 12a and 12b are turned on by sampling pulses $\phi 3a$ and $\phi 3b$ as shown in FIG. 4 to short-circuit the inputs and outputs of the amplifier sections 5 and 6, and their voltages are reset to the intermediate voltages of the inputs and outputs. During this period, the CMOS switches 15, 16, and 17 are opened (off) by sampling pulses $\phi 1$ and $\phi 2$.

In period "b," the CMOS switch 12a is set to open by sampling pulse $\phi 3a$. After the specified time, $T_0$, elapses, the CMOS switch 12b is set to open by sampling pulse $\phi 3b$. The light currents from the photodiodes 1 and 2 corresponding to the strength of incident light are amplified by the current mirror circuits 3 and 4, the light currents are input to the amplifier sections 5 and 6, and the charges corresponding to the light currents are accumulated in the capacitors of the amplifier sections 5 and 6.

In period "c," the CMOS switch 15 is closed (turned on) by sampling pulse $\phi 1$ to set the voltages at both ends (points SA and SB in FIG. 3) of the clock-type comparator 7 to the intermediate voltage thereof. The capacitors in the amplifier sections 5 and 6 remain being charged by the light currents from the photodiodes 1 and 2 corresponding to the strength of incident light.

In period "d," the CMOS switch 15 is set to open by sampling pulse $\phi 1$ to release the balanced condition of the clock-type comparator 77, which is balanced to the intermediate voltage. At the same time, the CMOS switches 16 and 17 are turned on by sampling pulse $\phi 2$, and the outputs of the two amplifier sections 5 and 6 (the outputs of the photodiodes 1 and 2) are input to the clock-type comparator 77, respectively. Whichever has a lower voltage between points SA and SB of the clock-type comparator 7 is set to low and the other is set to high. The condition of the comparator 7 becomes stable.

The capacitor of the amplifier section 5 is charged during period $T_a$ from the falling edge of sampling pulse $\phi 3a$ to the rising edge in FIG. 4. The capacitor of the amplifier section 6 is charged during period $T_b$ from the falling edge of sampling pulse φ3b to the rising edge. Since sampling pulse φ3b rises at the same timing as sampling pulse φea, and falls time $T_0$ later than sampling pulse φ3a, as described above, $T_a=T_b+T_0$. Therefore, more charges are accumulated in the capacitor of the amplifier section 5 than in that of the amplifier section 6 because $T_a>T_b$. Since the outputs of the amplifier sections 5 and 6 are inverted, the voltage at point SA is lower than that at point SB, making the voltage at point SB high.

When the read control section 144 sends selection signal $X_n$ to the read section 8 in either of periods "a" or "b," the voltage at point SB in the clock-type comparator 7 is inverted, and then output to the read section 147 as digital value $Y_n$. In this case, since the voltage at point SB is high, a low signal is output.

Figure 9:
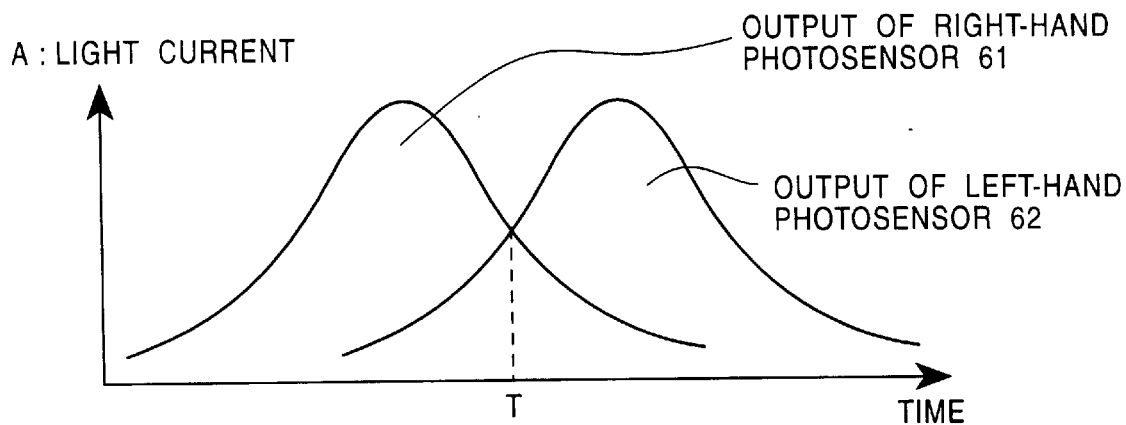
FIG. 9 is a waveform chart describing the operation principle of the cell shown in FIG. 8.
Figure 10:
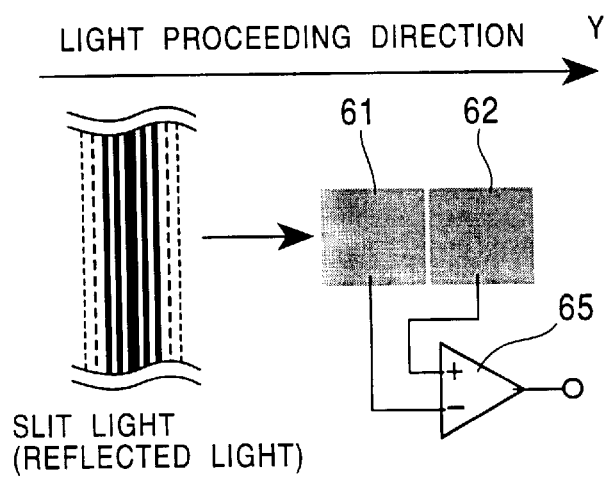
FIG. 10 is a view showing a relative movement of slit light against the cell shown in FIG. 8.
Figure 11:
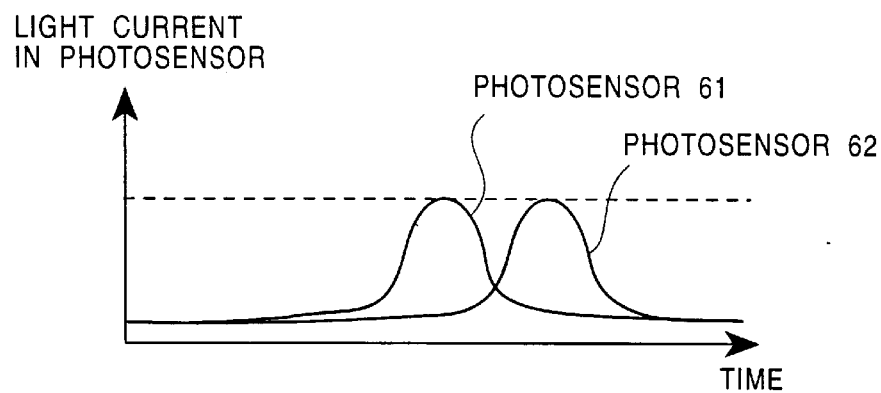
FIG. 11 is a waveform chart showing light current generated in a photosensor in the cell according to the relative movement of slit light shown in FIG. 10.
Figure 12:
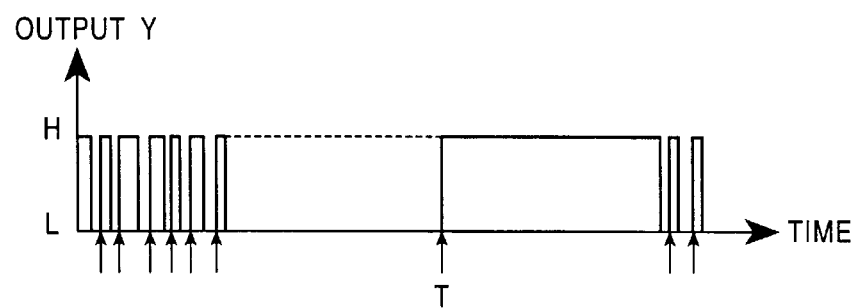
FIG. 12 is a waveform chart showing changes in output Y of the comparator in the cell shown in FIG. 10.
Figure 13:
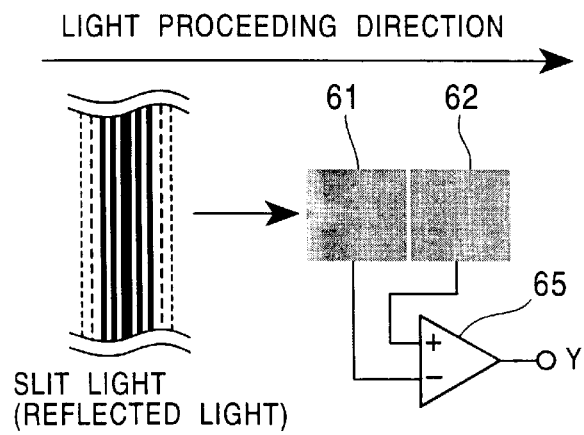
FIG. 13 is a view showing a relative movement of slit light against a modified embodiment of the cell shown in FIG. 8, which has stabilized the measurement.
Figure 14:
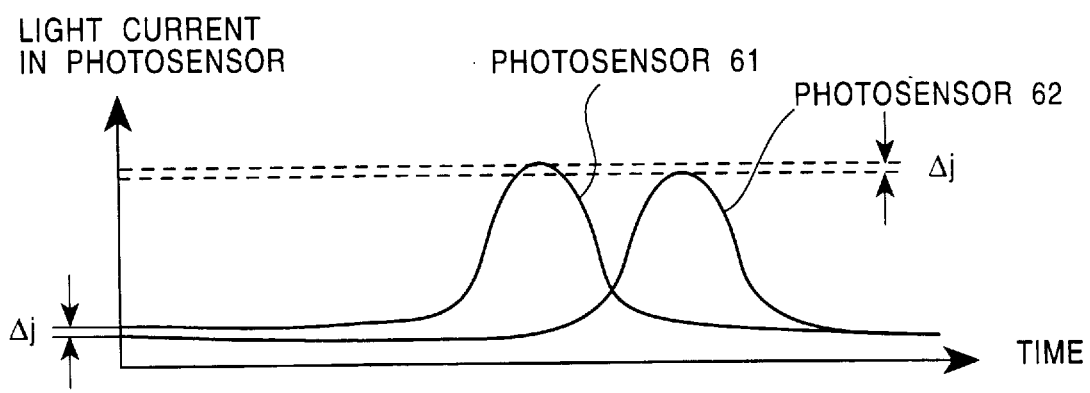
FIG. 14 is a waveform chart showing light current generated in a photosensor in the cell according to the relative movement of slit light shown in FIG. 13.
Figure 15:
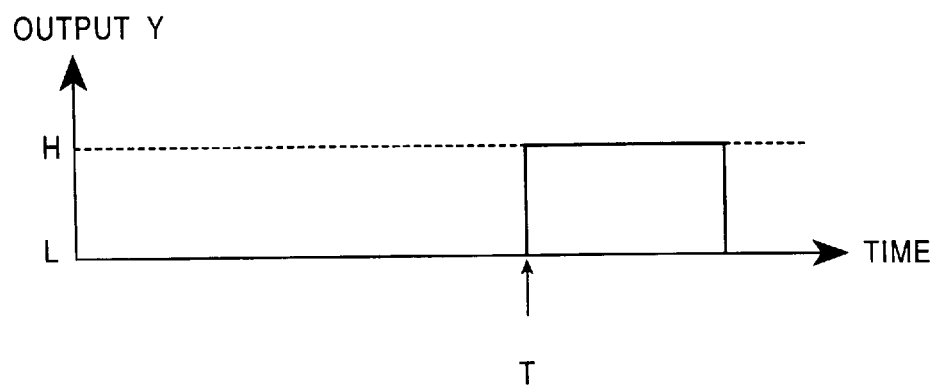
FIG. 15 is a waveform chart showing changes in output Y of the comparator in the cell shown in FIG. 13.
Figure 16:
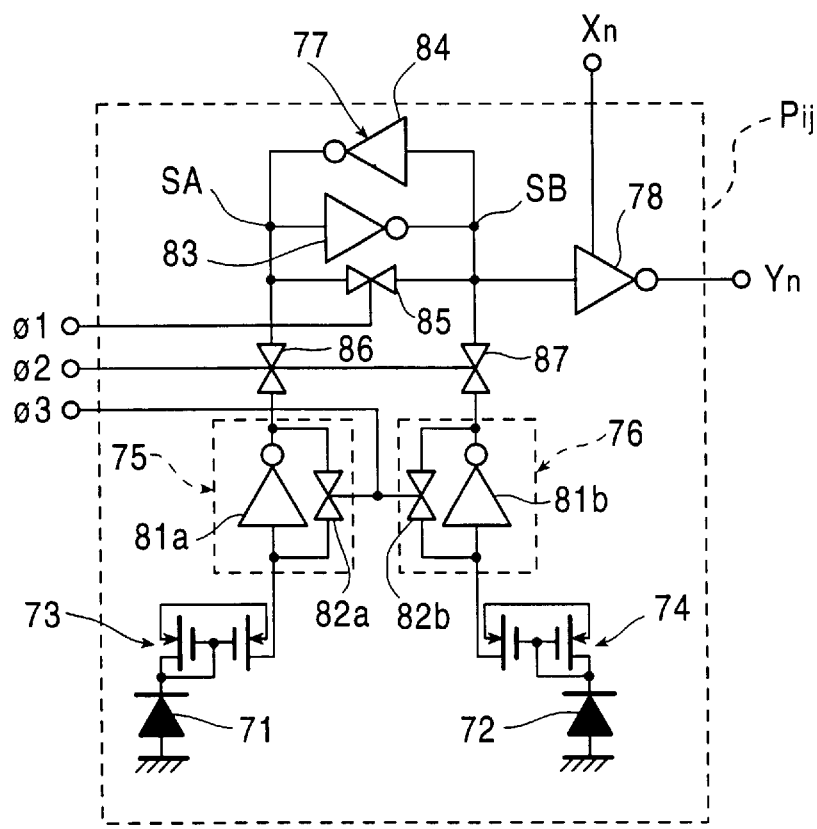
FIG. 16 is a circuit diagram showing a configuration of a modified embodiment of the cell shown in FIG. 8.
Figure 17:
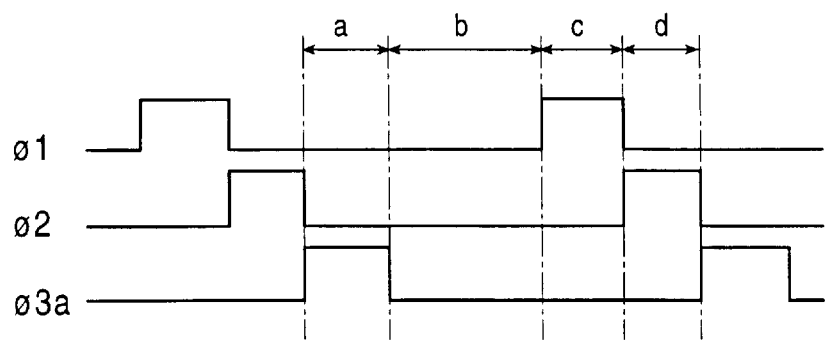
FIG. 17 is a timing chart showing the operation of the cell shown in FIG. 16.

As described above by referring to FIG. 9, this digital value $Y_n$ changes from low to high at time T when reflected slit light is input. The read section 147 detects the time at which the digital value $Y_n$ changes from low to high, and outputs a detection signal indicating the detection to the count memory 145. The count memory 145 holds the count of the counter 141 at the corresponding cell sect $M_{i,j}$ when the detection signal is input, assuming that reflected slit light moves across cell $P_{i,j}$ at that time.

In other words, the are as of the two photodiodes 1 and 2 are made equal and the periods in which both ends of the amplifiers 5 and 6 connected to the photodiodes 1 and 2 respectively are short-circuited are made different by sampling pulses φ3a and φ3b in this embodiment. With this configuration, periods $T_a$ and $T_b$ in which the amplifier sections 5 and 6 are charged by the outputs of the photodiodes 1 and 2 differ (period $T_a$ in which the amplifier 5 is charged by the output of the photodiode 1 that receives light first is longer than period $T_b$ in which the amplifier 6 is charged by the output of the photodiode 2 that receives light last), making the initial state of the clock-type comparator 7 stable.

Assuming that the characteristics of the photodiodes 1 and 2 are the same and the distribution of the ambient light is uniform, in the initial state (when reflected slit light is not incident), output $Y_n$ is high if $T_a<T_b$, output $Y_n$ is unstable if $T_a=T_b$, and output $Y_n$ is low if $T_a>T_b$. Periods $T_a$ and $T_b$, namely, the timing of sampling pulses φ3a and φ3b is set such that, in an environment in which distance measurement is actually performed, output $Y_n$ is low when slit light is not incident, and output $Y_n$ changes from low to high when slit light is emitted to the object to be measured 53 in measurement. The user needs to operate the input section 143, as required, to set the timing of sampling pulses φ3a and φ3b in response to the measurement environment and the object to be measured.

According to the distance measuring apparatus of the present embodiment, if the characteristics of the two photodiodes 1 and 2 differ or the magnitudes of bias light received by the photodiodes differ due to a difference in the spatial positions, the periods ($T_a$ and $T_b$) in which the amplifier sections 5 and 6 are charged by the outputs of the photodiodes 1 and 2 are adjusted to suppress an unstable condition of output $Y_n$ and to reduce noise influences. In other words, even when the initial state is not stable due to the state of the environment, correct measurement is possible with appropriate adjustment. Even if the photodiodes 1 and 2 output different magnitudes of light currents (there is a difference in sensitivity), measurement is made possible by adjusting the difference. Moreover, if weak slit light is used, adjustment can be made such that output $Y_n$ is made high. This means that adjustment is possible to allow measurement to be performed even if reflected slit light is very weak.

Figure 5:
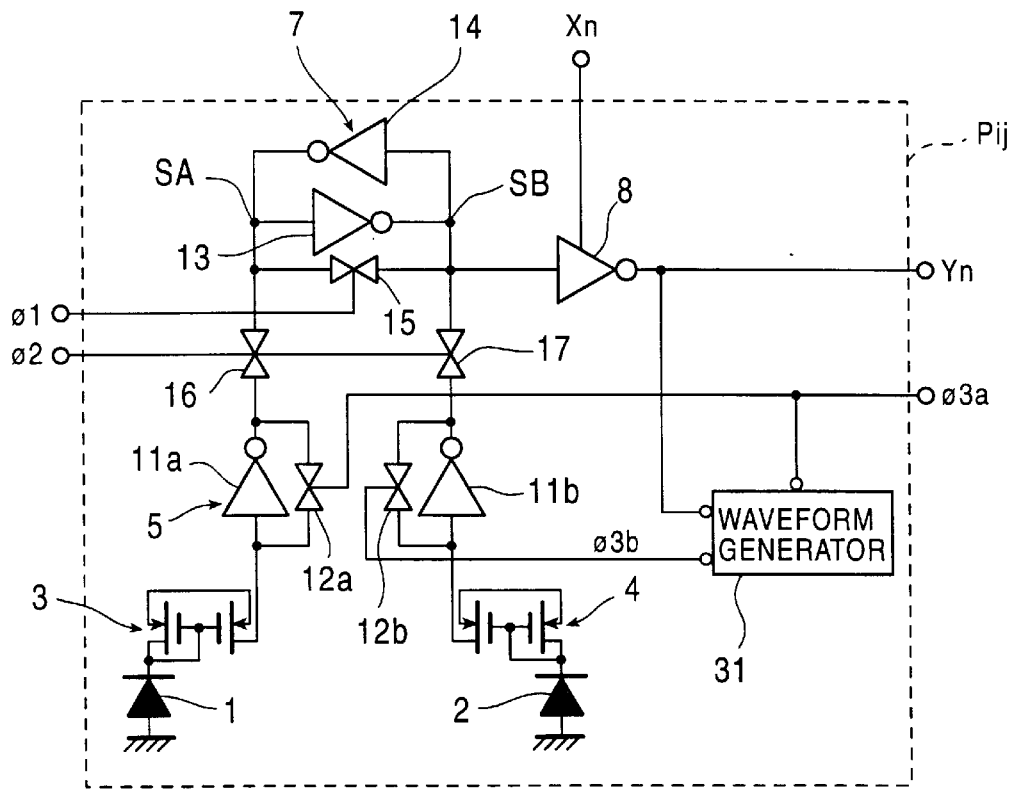
FIG. 5 is a circuit diagram illustrating a configuration of another embodiment of the cell in the distance measuring apparatus shown in FIG. 3.

FIG. 5 shows another embodiment of cell $P_{i,j}$. In this embodiment, the read control section 144 is made such that sampling pulses φ1, φ2, and φ3a only are output (sampling pulse φ3b is not output). Sampling pulse φ3a is supplied to a waveform generator 31 as well as to the CMOS switch 12a. The output of the read section 8 is also supplied to the waveform generator 31. The waveform generator 31 extends the period in which sampling pulse φ3a is high to generate sampling pulse φ3b, and supplies it to the CMOS switch 12b. The other configuration is the same as that in the embodiment shown in FIG. 3.

In this embodiment, the read control section 144 generates sampling pulses φ1, φ2, and φ3a at the timing when actual measurement is performed and also generates them at the timing for determining an extension time used in the waveform generator 31.

When sampling pulse φ3a is input to the waveform generator 31, the generator extends the period in which sampling pulse φ3a is high by the specified time to form another sampling pulse, and outputs it to the CMOS switch 12b as sampling pulse φ3b. The read control section 144 also generates sampling pulses φ1 and φ2, and selection signal $X_n$ in the same way as in FIG. 4. As a result, output $Y_n$ of the read section 8 is input to the waveform generator 31. The waveform generator 31 checks output $Y_n$ of the read section 8. When output $Y_n$ is high, the extension time is changed to a longer time. This operation is repeated until output $Y_n$ becomes low and stable. When output $Y_n$ is stable at low, the extension time is set to the value used at that time. This process for determining the extension time is conducted at every scanning.

Therefore, output $Y_n$ is always set to low at the initial condition immediately before reflected slit light is incident at every scanning in actual measurement.

In this embodiment, the process for determining the extension time used in the waveform generator 31 is conducted at every scanning with slit light, stable measurement is enabled.

In addition to the advantages obtained in the embodiment shown in FIG. 3, the embodiment shown in FIG. 5 allows stable measurement with dynamic initialization. In other words, even when a reflection condition changes at each portion of the object to be measured 53, or the distance measuring apparatus moves, since the waveform generator 31 automatically generates sampling pulse φ3b such that output $Y_n$ is always low at appropriate periods, stable measurement is allowed.

Photodiodes serve as photosensors in the above descriptions. Devices transforming light into an electric signal, such as phototransistors, may be used.

This invention is also applied to a case in which a range image and intensity image are obtained at the same time by dividing slit light reflected from the object to be measured 53 with a prism and by receiving the reflected slit light with different sensors, which has been proposed by the inventors in Japanese Patent Application laid open No. 34323/94.

What is claimed is:

1. A distance measuring method comprising the steps of:

scanning a surface of an object to be measured with slit light;

receiving the slit light reflected from said object to be measured on an imaging plane comprising a plurality of cells each of which has a pair of photosensors disposed side by side in the direction in which the reflected slit light moves, one of said pair of photosensors being enabled to collect light from said reflected slit light for a longer period than the other;

providing electronic signals to enable said photosensors to collect light, wherein one of said pair of photosensors is enabled to collect light for a longer period than the other of said pair of photosensors;

comparing the magnitudes of the light currents output from said pair of photosensors in each cell;

detecting the time at which said reflected slit light moves from one of said pair of photosensors to the other according to the result of the comparison, said time being regarded as the time at which said reflected slit light passes said plurality of cells; and measuring the position of said surface of said object from the times when said reflected slit light passes said plurality of cells forming said imaging plane.

2. A distance measuring method according to claim 1, wherein whichever of said pair of photosensors receives said reflected slit light first is enabled to collect light from said reflected slit light for a longer period than the other photosensor, which receives said reflected slit light later.

3. A distance measuring method according to claim 1, wherein the time periods during which said pair of photosensors receive said reflected slit light can be set to any value.

4. A distance measuring method according to claim 1, wherein the time periods during which said pair of photosensors receive said reflected slit light are determined for each scanning.

5. A distance measuring apparatus comprising:

means for emitting slit light to an object to be measured and for scanning a surface of said object with said slit light;

means for receiving the slit light reflected from said object on an imaging plane comprising a plurality of cells, each cell including a pair of photosensors which are disposed side by side in the direction in which the reflected slit light moves and one of which is electronically enabled to receive said reflected slit light for a longer period than the other, and a comparator for comparing the magnitudes of the light currents output from said pair of photosensors;

means for detecting the time at which the relationship between the magnitudes of the light currents output from said pair of photosensors is reversed; and means for measuring the position of said surface of said object according to said time for each cell.

6. A distance measuring apparatus according to claim 5, wherein whichever of said pair of photosensors receives said reflected slit light first is enabled to receive said reflected slit light for a longer period than the other photosensor, which receives said reflected slit light later.

7. A distance measuring apparatus according to claim 5, further comprising means for setting to any value the time periods during which each of said pair of photosensors is enabled to receive said reflected slit light.

8. A distance measuring apparatus according to claim 5, further comprising means for determining for each scanning the time periods during which said pair of photosensors receive said reflected slit light.

9. A distance measuring method according to claim 1, further comprising enabling both of said photosensors in each said pair of photosensors to collect light simultaneously.

10. A distance measuring apparatus according to claim 5, wherein each of said photosensors of each of said pair of photosensors is enabled to collect light simultaneously.

11. A distance measuring apparatus comprising:

a light source and optical system which emits slit light to an object to be measured and scans a surface of said object with said slit light;

an photosensitive array which receives the slit light reflected from said object on a plurality of cells, each cell including a pair of photosensors which are disposed side by side in a direction in which the reflected slit light moves;

a circuit for independently enabling each of said photosensors to detect light, wherein one of said pair of photosensors is enabled for a longer period than the other;

a comparator associated with each said cell which compares the light detected by each of said pair of photosensors and indicates a time at which the photosensor of said pair which is receiving more light than the other changes;

a memory which stores said indicated times; and a processor which determines the position of said surface of said object according to said stored times for each cell.

12. A distance measuring apparatus according to claim 11, further comprising:

a charge collector associated with each said photosensor which collects charge in proportion to an amount of light received by said associated photosensor;

wherein said circuit for independently enabling each of said photosensors includes a switch associated with each said charge collector for enabling each said charge collector to collect charge from said associated photosensor.

13. A distance measuring apparatus according to claim 12, further comprising a pair of signals each of which is provided to one of said switches, wherein said pair of signals cause one switch to enable one charge collector to collect charge for a longer period that the charge collector associated with the other photosensor of said pair.

14. A distance measuring apparatus according to claim 12, wherein each photosensor is connected to said associated charge collector through a current mirror.

* * * * *